(12) United States Patent
Okayama

(10) Patent No.: US 8,218,932 B2
(45) Date of Patent: Jul. 10, 2012

(54) POLARIZATION INDEPENDENT OPTICAL DEVICE

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 246 days.

(21) Appl. No.: 12/801,234

(22) Filed: May 28, 2010

(65) Prior Publication Data

US 2011/0013195 A1    Jan. 20, 2011

(30) Foreign Application Priority Data

Jul. 15, 2009   (JP) .................................. 2009-167038

(51) Int. Cl.
*G02B 6/10*   (2006.01)
(52) U.S. Cl. ........................................ 385/131
(58) Field of Classification Search .................... None
See application file for complete search history.

(56) References Cited

U.S. PATENT DOCUMENTS

| | | | |
|---|---|---|---|
| 4,860,294 A | 8/1989 | Winzer et al. | |
| 5,764,826 A | 6/1998 | Kuhara et al. | |
| 5,960,135 A | 9/1999 | Ozawa | |
| 7,072,541 B2 | 7/2006 | Kim et al. | |
| 2007/0147725 A1* | 6/2007 | Crespi et al. ...................... | 385/9 |

FOREIGN PATENT DOCUMENTS

JP    08-163028 A    6/1996

* cited by examiner

*Primary Examiner* — Sung Pak
(74) *Attorney, Agent, or Firm* — Rabin & Berdo, P.C.

(57) ABSTRACT

An optical device includes a core sandwiched between two clads. The core includes a planar waveguide layer with ridges protruding into one of the clads, forming a ridge waveguide structure that guides the propagation of light in the core. The core dimensions satisfy the following conditions: the ridge width is less than the total core height; the ridge height is less than the ridge width; the thickness of the planar waveguide layer is equal to or less than one-fourth of the total core height. Dimensions satisfying these conditions can be selected to provide polarization independent operation. The ridges may be arranged to define a pair of optical waveguides forming a Mach-Zehnder interferometer, an optical wavelength filter, or various other optical devices.

8 Claims, 9 Drawing Sheets

FIG.6

| | WAVELENGTH 1.49 μm | | TE WAVE | TM WAVE |
|---|---|---|---|---|
| DIRECTIONAL COUPLER | EQUIVALENT REFRACTIVE INDEX | $N_{eff0}$ : m = 0 (SYMMETRIC MODE) | 2.70155 | 2.69600 |
| | | $N_{eff1}$ : m = 1 (ANTI-SYMMETRIC MODE) | 2.68216 | 2.67773 |
| | $dN_{eff}$ : EQUIVALENT REFRACTIVE INDEX DIFFERENCE ($\lvert N_{eff0} - N_{eff1} \rvert$) | | 0.01939 | 0.01826 |
| | $L_c$ : COUPLING LENGTH (μm) | | 38.4 | 40.8 |
| INTER-FEROMETER | $N_{effa}$ : EQUIVALENT REFRACTIVE INDEX | | 2.69185 | 2.68687 |
| ERROR | $dN_{eff}/dW$ (nm$^{-1}$) | | $2.39 \times 10^{-3}$ | $1.33 \times 10^{-3}$ |
| | $dL_c/dW$ (μm/nm) | | $4.5 \times 10^{-3}$ | $-2.8 \times 10^{-3}$ |
| | $dL_c/dS$ (μm/nm) | | $-1.1 \times 10^{-2}$ | $-1.4 \times 10^{-2}$ |

FIG.7

| | WAVELENGTH 1.31 μm | | TE WAVE | TM WAVE |
|---|---|---|---|---|
| DIRECTIONAL COUPLER | EQUIVALENT REFRACTIVE INDEX | $N_{eff0}$ : m = 0 (SYMMETRIC MODE) | 2.87665 | 2.88003 |
| | | $N_{eff1}$ : m = 1 (ANTI-SYMMETRIC MODE) | 2.86983 | 2.87327 |
| | $dN_{eff}$ : EQUIVALENT REFRACTIVE INDEX DIFFERENCE ($|N_{eff0} - N_{eff1}|$) | | 0.00681 | 0.00676 |
| | Lc : COUPLING LENGTH (μm) | | 96.1 | 96.9 |
| INTER-FEROMETER | $N_{effa}$ : EQUIVALENT REFRACTIVE INDEX | | 2.87324 | 2.87665 |
| ERROR | $dN_{eff}/dW$ (nm$^{-1}$) | | $2.9 \times 10^{-3}$ | $1.12 \times 10^{-3}$ |
| | $dLc/dW$ (μm/nm) | | $4.5 \times 10^{-3}$ | $-4.5 \times 10^{-3}$ |

POLARIZATION INDEPENDENT OPTICAL DEVICE

BACKGROUND OF THE INVENTION

1. Field of the Invention

The present invention relates to a polarization independent optical device.

2. Description of the Related Art

In optical subscriber systems, since upstream communication (optical transmission from subscribers to the central office) and downstream communication (optical transmission from the central office to the subscribers) are carried on a single optical fiber, the upstream and downstream optical signals have different wavelengths. The central office and the subscriber equipment must therefore have optical wavelength filters for the corresponding wavelengths. In general, the optical subscriber equipment, referred to as an optical network unit (ONU), includes a light emitting element and a photodetector having optical axes that must be aligned through respective wavelength filters with the optical axes of an optical splitter/combiner when the equipment is assembled.

Recently, waveguide-type optical wavelength filters, which obviate the need for optical axis alignment, have been under study. Some known optical wavelength filters of this type use Mach-Zehnder interferometers, directional couplers, and grating reflectors, as disclosed in U.S. Pat. Nos. 4,860,294, 5,764,826, 5,960,135, and 7,072,541 and Japanese Patent Application Publication No. H8-163028.

Optical wavelength filters using directional couplers exhibit a strong wavelength dependency in the passband, and are accordingly sensitive to light source wavelength error. It is also difficult to reduce the size of these optical filters, which is on the order of hundreds of micrometers.

Optical wavelength filters using gratings of high reflection efficiency can provide a fixed transmittance in the passband. To obtain high reflection efficiency, however, the grating spacing must be less than half the wavelength of the light to be transmitted, which makes it difficult to create a grating with adequate dimensional precision.

Optical wavelength filters using a Mach-Zehnder interferometer have the advantage that their wavelength characteristics can be designed on the basis of optical circuit theory.

The equivalent refractive index and coupling coefficient of an Mach-Zehnder optical wavelength filter made by using conventional submicron-order silicon wire or channel waveguides have a strong wavelength dependency, however, which creates difficulties in ONU design. This type of optical filter also exhibits extremely high polarization dependency, so it has only been possible to use one of the two (TE and TM) polarization components.

SUMMARY OF THE INVENTION

A general object of the present invention is to provide a polarization independent optical device.

Another object is to provide a polarization independent optical device including an interferometer and a directional coupler.

Another object is to provide polarization independent optical devices suitable for use as optical wavelength filters, optical switches, and optical resonators.

In this polarization independent optical device, an optical element is formed on a major surface of a substrate. The optical element includes a first clad, a second clad, and a core sandwiched between the first and second clads. The refractive index of the core preferably exceeds the refractive index of the clads by at least forty percent. The core may be made of silicon and the clads of silicon dioxide.

The core includes a planar waveguide layer with respective surfaces in contact with the first clad and the second clad. The planar waveguide layer has a constant thickness.

The core also includes a plurality of ridges protruding from the planar waveguide layer into the second clad. The ridges are integral with the planar waveguide layer, forming a ridge waveguide structure that guides the propagation of light in the core.

Seen looking in the direction of light propagation, the ridges have a rectangular cross section with constant dimensions. These dimensions include a ridge width measured parallel to the planar waveguide layer and a ridge height measured from the planar waveguide layer to the tops of the ridges.

The dimensions of the planar waveguide layer and the ridges satisfy the following conditions:

the ridge width is less than the total core height, which includes both the ridge height and the thickness of the planar waveguide layer;

the ridge height is less than the ridge width; and the thickness of the planar waveguide layer is equal to or less than one-fourth of the total core height.

Dimensions satisfying these conditions can be selected so that optical parameters such as coupling length and effective refractive index are substantially independent of the polarization of the light propagating through the core.

The ridges may be arranged to define two optical waveguides forming a Mach-Zehnder interferometer having a directional coupler at each end. Alternatively, the ridges may be arranged to form an optical wavelength separation filter including an even number of such Mach-Zehnder interferometers, or to form various other optical devices.

BRIEF DESCRIPTION OF THE DRAWINGS

In the attached drawings:

FIG. 6 is a table of optical parameters of the optical device in FIG. 1 for light with a wavelength of 1.49 µm;

FIG. 7 is a table of optical parameters of the optical device in FIG. 1 for light with a wavelength of 1.31 µm;

DETAILED DESCRIPTION OF THE INVENTION

Figure 1:
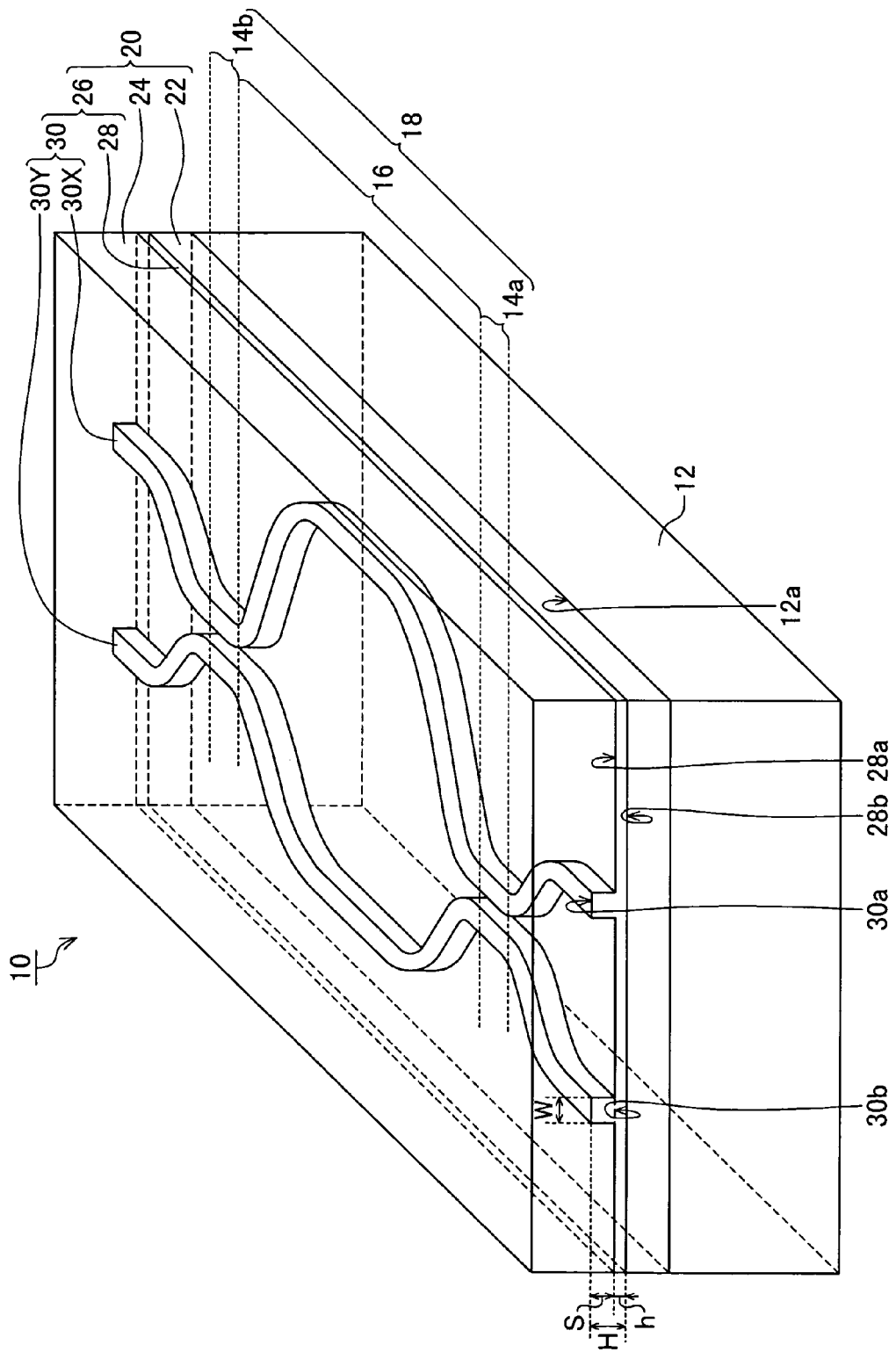
FIG. 1 is a schematic perspective view illustrating the structure of a polarization independent optical device in an embodiment of the invention.

A non-limiting embodiment of the invention will now be described with reference to the attached drawings, in which like elements are indicated by like reference characters, and in which sizes, shapes, and positional relationships are shown only schematically.

Figure 2:
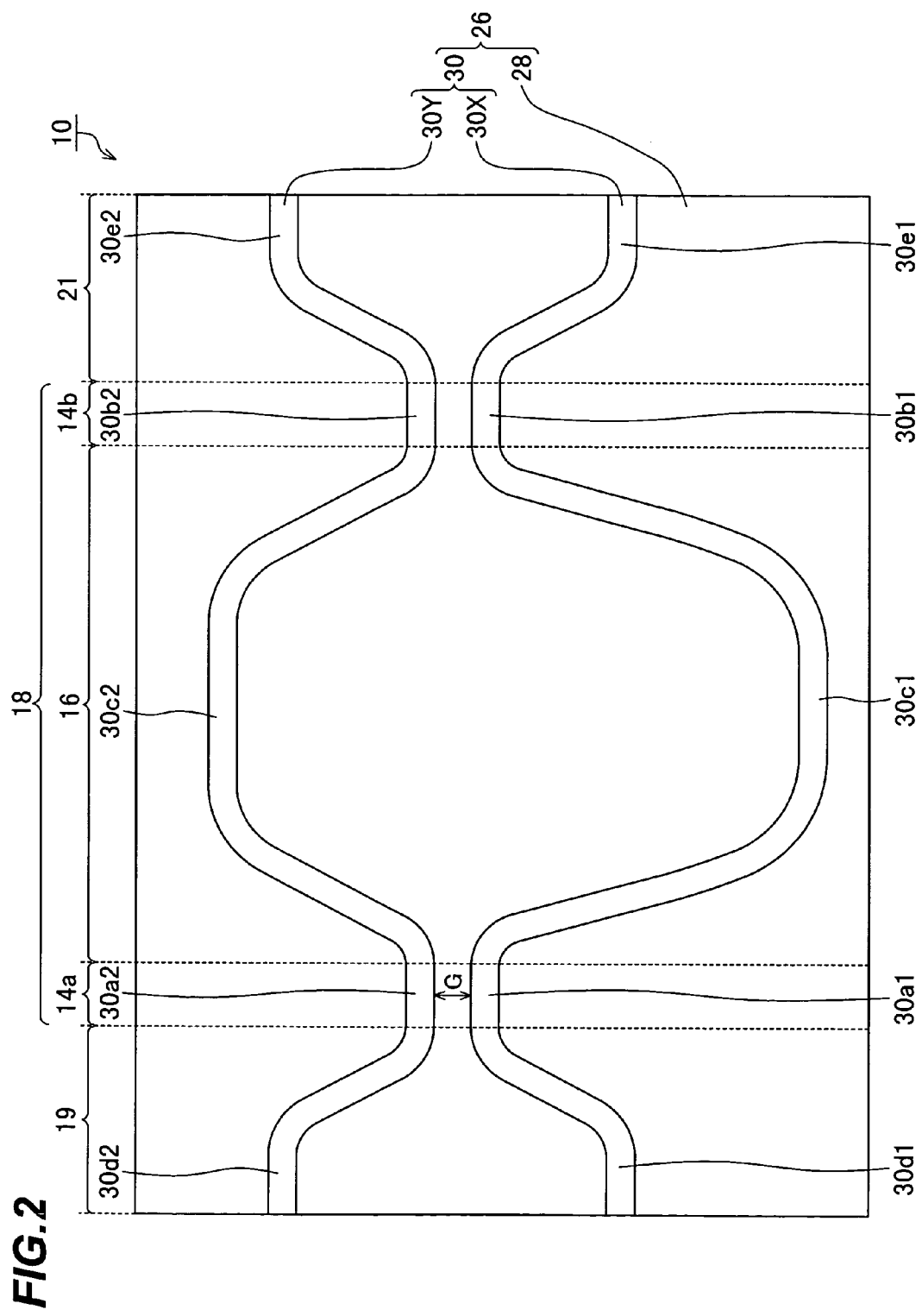
FIG. 2 is a schematic plan view of the polarization independent optical device in FIG. 1.

The embodiment is a polarization independent optical device 10 with the structure shown in FIGS. 1 and 2. For clarity, the ridges 30 are indicated by solid lines instead of phantom lines in these drawings, even though they are embedded in the clads 22, 24 and would not be visible to the eye.

The polarization independent optical device 10 has a Mach-Zehnder interferometer 18 disposed on a first major surface 12a of a substrate 12. The Mach-Zehnder interferometer 18 has directional couplers 14a, 14b between which an optical interferometer 16 is connected. The directional couplers 14a, 14b and the optical interferometer 16 are formed by a ridge waveguide structure 20. The polarization independent optical device 10 also has an input zone 19 on the input side of the Mach-Zehnder interferometer 18 and an output zone 21 on the output side, as indicated in FIG. 2.

The ridge waveguide structure 20 will be described with reference mainly to FIG. 1.

The ridge waveguide structure 20 includes a first clad 22 formed on the first major surface 12a of the substrate 12, a second clad 24 formed on the first clad 22, and a core 26 sandwiched between the first and second clads 22, 24.

The first clad 22 is, for example, a layer of silicon dioxide ($SiO_2$) having a refractive index of 1.46, covering the entire first major surface 12a of the substrate 12. The first clad 22 should be thick enough to keep light from leaking from the core 26 into the substrate 12. An exemplary thickness is about 1 µm or greater.

The second clad 24 is, for example, a layer of silicon dioxide having a refractive index of 1.46, covering the entire surface of the core 26.

The core 26 has a slab-like planar waveguide layer 28, from which a pair of ridges 30 protrude into the second clad 24. The ridges 30 are integral with the planar waveguide layer 28 and are made of the same material as the planar waveguide layer 28.

The ridges 30 include a first ridge 30X and a second ridge 30Y. The configuration of the ridges 30 defines the input zone 19, Mach-Zehnder interferometer 18, and output zone 21 of the polarization independent optical device 10, as will be described with reference to FIG. 2. The ridges 30X, 30Y extend continuously from the input zone 19 to the output zone 21. In the descriptions below, where it is not necessary to distinguish between the two ridges 30X, 30Y, either of them may be referred to as a ridge 30.

The refractive index of the material of the core 26 should be at least 40% greater than the refractive index of the material of the first and second clads 22, 24. An exemplary preferred core material is silicon (Si) having a refractive index of 3.49.

The distance between the bottom surface 28b of the planar waveguide layer 28 and the tops 30a of the ridges 30 will be referred to as the total core thickness H. In this embodiment, an exemplary preferred value of the total core thickness H is about 0.4 µm.

The planar waveguide layer 28 extends as a parallel plate over the surface of the first clad 22, and has a constant thickness h. The thickness h of the planar waveguide layer 28 is the distance between its top surface 28a and bottom surface 28b. An exemplary preferred value of the planar waveguide thickness h is about 0.07 µm.

The ridges 30 protrude from the top surface 28a of the planar waveguide layer 28 into the second clad 24, and have a rectangular cross section in any plane orthogonal to the direction of light propagation through the core 26.

The distance between the tops 30a and bottoms 30b of the ridges 30 will be referred to as the ridge height S. The bottoms 30b of the ridges are level with the top surface 28a of the planar waveguide layer 28. The ridge height S is therefore the height of the ridges 30 above the top surface 28a of the planar waveguide layer 28. An exemplary preferred value of the ridge height S is about 0.33 µm. The total core thickness H is the sum of the ridge height S and the planar waveguide thickness h (H=h+S).

In the rectangular cross section of the ridges 30, the length of the sides parallel to the first major surface 12a of the substrate 12 and orthogonal to the direction of light propagation is the ridge width W. In this embodiment, an exemplary preferred value of the ridge width W is about 0.37 µm. The ridge width W and ridge height S are constant throughout the ridges 30.

The ridges 30 form a thickened part of the core 26. The equivalent refractive index of the ridges 30 is greater than the equivalent refractive index of the planar waveguide layer 28. Therefore, when light propagates through the ridge waveguide structure 20, it mainly follows the ridges 30.

For polarization independence of the optical device 10, the following three conditions must be satisfied simultaneously. These conditions will be described later in more detail.

The first condition is that the ridge width W must be less than the total core thickness H.

The second condition is that the ridge height S must be less than the ridge width W.

The third condition is that the planar waveguide thickness h must be equal to or less than one-fourth of the total core thickness H.

The structure and operation of the Mach-Zehnder interferometer 18 will be described briefly with reference mainly to FIG. 2.

In the Mach-Zehnder interferometer 18, the optical interferometer 16 is connected to the input zone 19 through directional coupler 14a and to the output zone 21 through directional coupler 14b.

Directional coupler 14a is formed by two sections 30a1, 30a2 of the first and second ridges 30X, 30Y that extend in parallel, spaced apart by a distance that allows optical coupling between them. At one end, ridge section 30a1 joins with a ridge section 30d1 of the first ridge 30X in the input zone 19; at the other end, ridge section 30a1 joins with a section 30c1 of the first ridge 30X in the optical interferometer 16. Similarly, ridge section 30a2 joins with a section 30d2 of the second ridge 30Y in the input zone 19 at one end, and with a section 30c2 of the second ridge 30Y in the optical interferometer 16 at the other end.

Directional coupler 14b includes similar mutually parallel sections 30b1, 30b2 of the first and second ridges 30X, 30Y spaced apart by a distance allowing optical coupling. Ridge section 30b1 joins at one end with section 30c1 of the first ridge 30X in the optical interferometer 16, and at the other end with a section 30e1 of the first ridge 30X in the output zone 21. Ridge section 30b2 joins at one end with section 30c2 of the second ridge 30Y in the optical interferometer 16, and at the other end with a section 30e2 of the second ridge 30Y in the output zone 21.

The distance between the mutually facing sides of ridge sections 30a1 and 30a2 is referred to below as the ridge gap G. An exemplary preferred value of the ridge gap G in directional coupler 14a is about 0.3 μm. Directional coupler 14b preferably has the same ridge gap G. The facing sides of sections 30a1 and 30a2 in directional coupler 14a may or may not have the same length as the facing sides of sections 30b1 and 30b2 in directional coupler 14b. The length of the facing sides is a design choice.

The ridge sections 30c1 and 30c2 that connect the directional couplers 14a and 14b to form the optical interferometer 16 are curved and have different optical path lengths. The difference between their optical path lengths will be denoted $\Delta L$. More specifically, the optical path length difference $\Delta L$ is the value obtained by subtracting the optical path length of ridge section 30c2 from the optical path length of ridge section 30c1.

In the Mach-Zehnder interferometer 18, ridge section 30a1 of directional coupler 14a, ridge section 30c1 of the optical interferometer 16, and ridge section 30b1 of directional coupler 14b constitute a single continuous optical waveguide. Ridge section 30a2 of directional coupler 14a, the ridge section 30c2 of the optical interferometer 16, and the ridge section 30b2 of directional coupler 14b constitute another continuous optical waveguide.

It is well known that a Mach-Zehnder interferometer 18 can be used as an optical wavelength filter. If the optical path length difference $\Delta L$ between the two ridge sections 30c1 and 30c2 of the optical interferometer 16 is set to an appropriate value, the Mach-Zehnder interferometer 18 can separate light of different wavelengths. This feature will now be described in further detail.

Suppose that mixed light including light of two different wavelengths is input through the input zone 19 to the waveguide defined by ridge 30X, thus to ridge section 30a1 of directional coupler 14a. The mixed light propagates through directional coupler 14a into the optical interferometer 16. In directional coupler 14a, a transfer of optical energy from ridge section 30a1 to ridge section 30a2 takes place. By the time the light leaves the end of directional coupler 14a, it is propagating through both ridge sections 30a1 and 30a2 with equal power.

The equally distributed light propagates from ridge sections 30a1 and 30a2 in directional coupler 14a into ridge sections 30c1 and 30c2 in the optical interferometer 16. Since sections 30c1 and 30c2 have different optical path lengths, the light propagating through the two arms of the optical interferometer 16 acquires a phase difference.

When the light reaches directional coupler 14b, the resulting interaction depends on this phase difference, which in turn depends on the wavelength of the light. If the optical path length difference $\Delta L$ of the optical interferometer 16 is selected appropriately, the Mach-Zehnder interferometer 18 can separate the mixed light input to ridge section 30a1 in directional coupler 14a into light of two different wavelengths. Light of one wavelength is output in the 'bar' state from the waveguide defined by ridge 30X, that is, from ridge section 30b1 in directional coupler 14b through ridge section 30e1 in the output zone 21. Light of the other wavelength is output in the 'cross' state from the waveguide defined by ridge 30Y, that is, from ridge section 30b2 in directional coupler 14b through ridge section 30e2 in the output zone 21.

The design conditions of the optical device, more specifically, the dimensional requirements of the ridge waveguide structure 20, will next be described with reference to FIGS. 3A, 3B, 4A, and 4B.

General optical subscriber systems use light having wavelengths of 1.31 μm and 1.49 μm. The graphs in FIGS. 3A and 4A were obtained by calculations for the 1.49-μm wavelength, for reasons given later below. The calculations were carried out by the finite element method. The refractive index of silicon in the ridge waveguide structure 20 was calculated from Sellmeier's equation, thereby taking the wavelength dependency of the refractive index into consideration.

Figure 3A:
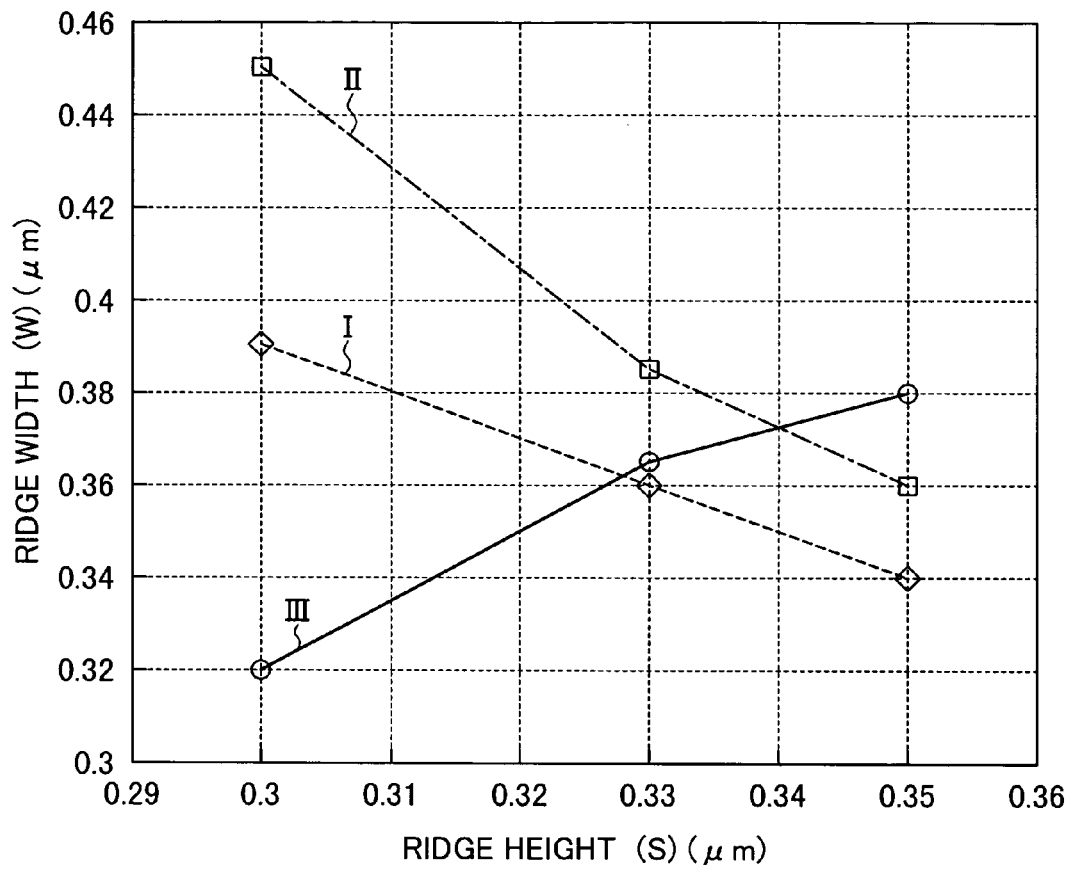
FIG. 3A is a graph illustrating relationships between ridge width W and ridge height S for achieving polarization independence of both the equivalent refractive index of the optical interferometer and the coupling length of the directional couplers used in the polarization independent optical device in the embodiment.

In FIG. 3A, the vertical axis represents the ridge width W and the horizontal axis represents the ridge height S, both values being given in micrometers (μm). This graph was obtained by varying the ridge width W and the ridge height S (planar waveguide thickness h) while holding the total core thickness H constant at 0.4 μm.

Figure 3B:
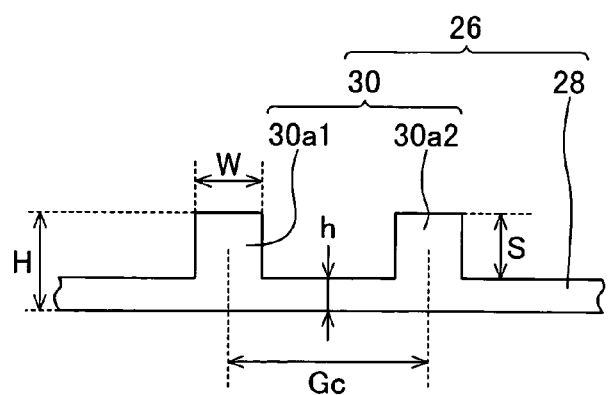
FIG. 3B is a schematic sectional view of a directional coupler illustrating the center-to-center gap Gc and other core dimensions relevant to FIG. 3A.

Curve I in FIG. 3A represents the relationship between the ridge width W and the ridge height S that gives directional coupler 14a a polarization independent coupling length when the gap Gc between the center axes of its constituent ridge sections 30a1, 30a2, shown in FIG. 3B, is 0.6 μm. The ridge widths W and heights S for which the TE wave and TM wave have the same coupling length are plotted. The gap Gc is also the center-to-center spacing between the first and second ridges 30X, 30Y in directional coupler 14a.

Curve II represents the relationship between the ridge width W and the ridge height S that gives directional coupler 14a a polarization independent coupling length when the center-to-center gap Gc is 0.7 μm.

Curve III represents the relationship between the ridge width W and ridge height S that gives the optical interferometer 16 a polarization independent equivalent refractive index by making the equivalent refractive index the same for both the TE wave and the TM wave.

In FIG. 3A, curves I and II intersect curve III. At each intersection, the ridge width W and ridge height S. make both the directional couplers 14a, 14b and the optical interferometer 16 polarization independent, so that the optical device 10 as a whole is polarization independent.

As the ridge height S in curve III increases, the ridge width W gradually approaches the total core thickness H (0.4 μm). The ridge width W shows this tendency because the cross-sectional shape of the ridge waveguide structure 20 approaches the shape of a silicon channel optical waveguide, which is known to exhibit polarization independence when its cross-sectional shape is square.

This leads to the first condition for polarization independence of the ridge waveguide structure 20 in the polarization independent optical device 10: the ridge width W must be less than the total core thickness H.

Curves I and II indicate that the ridge width. W that makes the coupling length of directional coupler 14a polarization independent decreases as the ridge height S increases. The reason for this tendency is as follows.

In general, changes in the ridge width W and ridge height S tend to produce only small variations in the coupling length of the TM wave in directional coupler 14a, but as the ridge width W increases, a slight tendency for this coupling length to decrease is observed. The coupling length of the TE wave in directional coupler 14a, however, shows a tendency to increase as both the ridge width W and the ridge height S increase. The rate of change in coupling length with respect to a change in ridge height S is greater for the TE wave than for the TM wave.

These tendencies explain why the ridge width W at which the coupling length of the TE wave matches the coupling length of the TM wave in directional coupler 14a decreases as the ridge height S increases, as shown by curves I and II.

The reason why the coupling length of the TE wave changes more than the coupling length of the TM wave with respect to a change in ridge height S is thought to be that the TE wave has a greater optical field distribution in the core 26, and in particular in the planar waveguide layer 28, than does the TM wave. Given a constant total core thickness, the optical field distribution of the TE wave is therefore strongly influenced by changes in the ridge height S, which change the thickness of the planar waveguide layer 28, and these changes produce corresponding large changes in the coupling length.

The TE wave and TM wave have different optical field distributions in the space between ridge sections 30a1 and 30a2 in directional coupler 14a. This is why the ridge width W and ridge height S at which polarization independence is achieved depend on the center-to-center gap Gc between ridge sections 30a1 and 30a2. Curves I and II indicate that the ridge width W that gives polarization independence decreases as the center-to-center gap Gc decreases. Consequently, the point of intersection with curve III moves down and to the left in FIG. 3A, indicating that the ridge height S that gives polarization independence of both the coupling length in directional coupler 14a and the equivalent refractive index in the optical interferometer 16 decreases as the center-to-center gap Gc decreases.

Figure 4A:
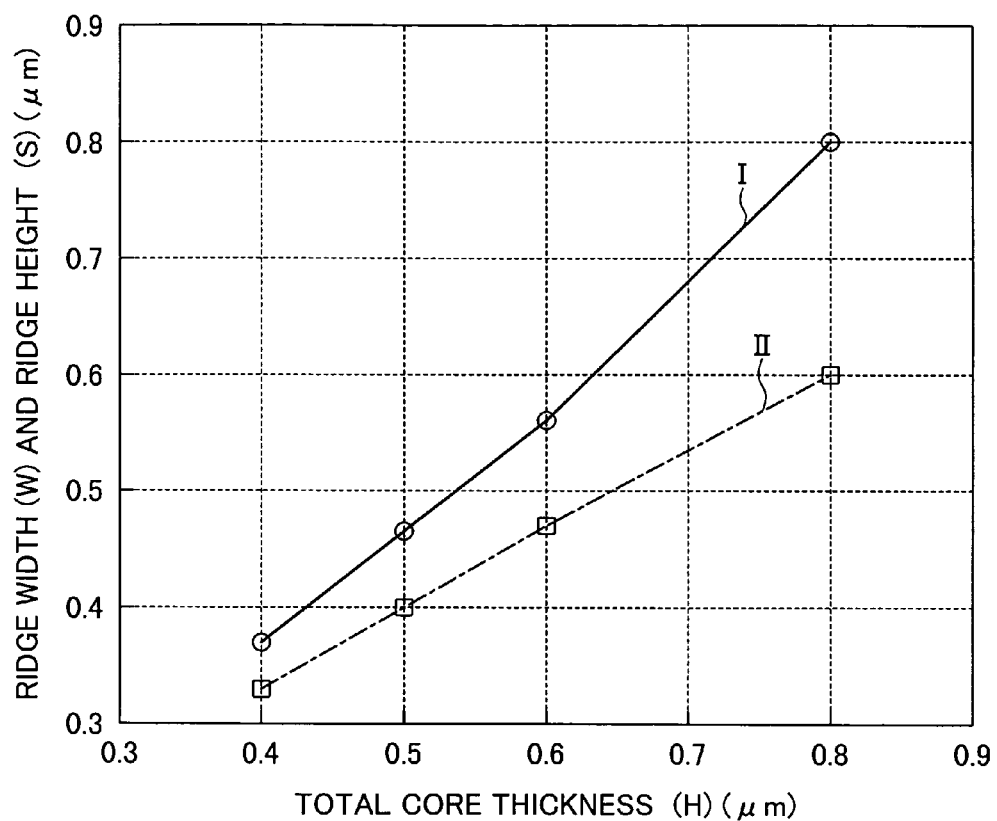
FIG. 4A is a graph illustrating relationships between the ridge widths W and ridge heights S for achieving polarization independence of both the equivalent refractive index of the optical interferometer and the coupling length of the directional coupler used in the polarization independent optical device in the embodiment and the total core thickness H.

The location of the point of intersection with curve III also varies depending on the total core thickness. This dependence is illustrated in FIG. 4A, which plots the ridge height S and ridge width W that give polarization independence of both the coupling length and the equivalent refractive index as a function of the total core thickness H. The vertical axis represents the ridge height S and ridge width W, and the horizontal axis represents the total core thickness H. All values are in micrometers.

Figure 4B:
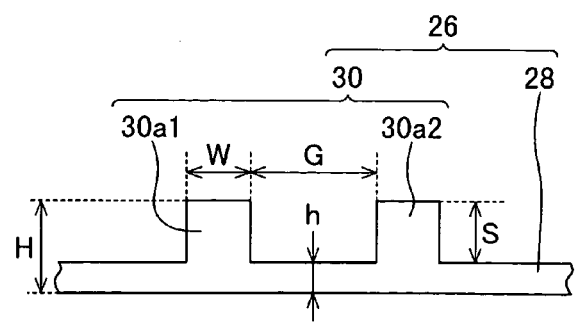
FIG. 4B is a schematic sectional view of a directional coupler illustrating the ridge gap G and other core dimensions relevant to FIG. 4A.

FIG. 4A was obtained by varying the total core thickness H while holding the ridge gap G constant at 0.3 μm, which is the smallest gap that could be created by applying semiconductor fabrication technology, and calculating the ridge height S and ridge width W that gave polarization independence. The ridge gap G, total core height H, and other parameters are illustrated in FIG. 4B. Curve I in FIG. 4A represents the ridge width W. Curve II represents the ridge height S.

The second and third conditions for polarization independence are derived from FIG. 4A. The curve I representing the ridge width W is higher than the curve II representing the ridge height S for all calculated values of the total core thickness H. This provides the second condition for polarization independence: the ridge height S must be less than the ridge width W.

In FIG. 4A, the thickness h of the planar waveguide layer 28 can be obtained by subtracting the ridge height S from the total core thickness H (h=H−S). A comparison of h and H provides the third condition for polarization independence: the planar waveguide thickness h must be equal to or less than one-fourth of the total core thickness H. For example, when the total core thickness H is 0.8 μm, the ridge height S is 0.6 μm, so the planar waveguide thickness h is 0.2 μm, equal to one-fourth of 0.8 μm.

High-order mode calculations using FIG. 4A showed that for light having a wavelength of 1.49 μm and a ridge waveguide structure 20 with a core 26 having dimensions conforming to FIG. 4A, single-mode light propagation takes place when the total core thickness H is 0.4 μm or less.

The reason for using light having a wavelength of 1.49 μm to determine the dimensional requirements for the polarization independent optical device 10 in FIGS. 3A and 4A is as follows.

If the polarization independent optical device 10 is made of monocrystalline silicon, the wavelength dependency of the directional couplers 14a, 14b is strong in the ONU wavelength range of 1.31 to 1.49 μm; the coupling length varies by a factor of four over this range. Coupling at a wavelength of 1.31 μm is much weaker than coupling at a wavelength of 1.49 μm.

It is advantageous in terms of design to output the more weakly coupled light, with a wavelength of 1.31 μm, in the bar state. Light having a wavelength of 1.49 μm must therefore be output in the cross state. It is known that a Mach-Zehnder interferometer with good output characteristics, i.e., a high extinction ratio, in the cross state generally requires a precisely determined coupling length, while a high extinction ratio in the bar state can be achieved without a precisely determined coupling length.

This is the reason why the polarization independent optical device 10 is designed in relation only to light having a wavelength of 1.49 μm.

The principle of polarization independent operation of the directional couplers 14a, 14b of the polarization independent optical device 10 in this embodiment will now be described with reference to FIGS. 5A and 5B, which schematically show the TM and TE wave distributions in a directional coupler including optical waveguides of the channel type, without a planar waveguide layer.

Figure 5A:
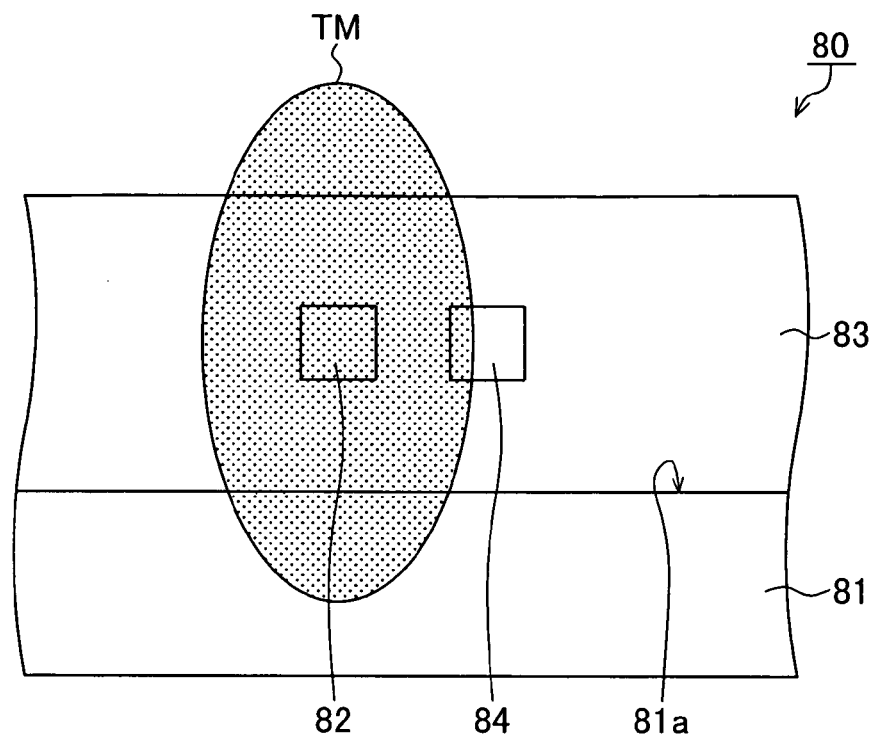
FIG. 5A is a schematic sectional view of a directional coupler with channel optical waveguides, showing the TM wave distribution.
Figure 5B:
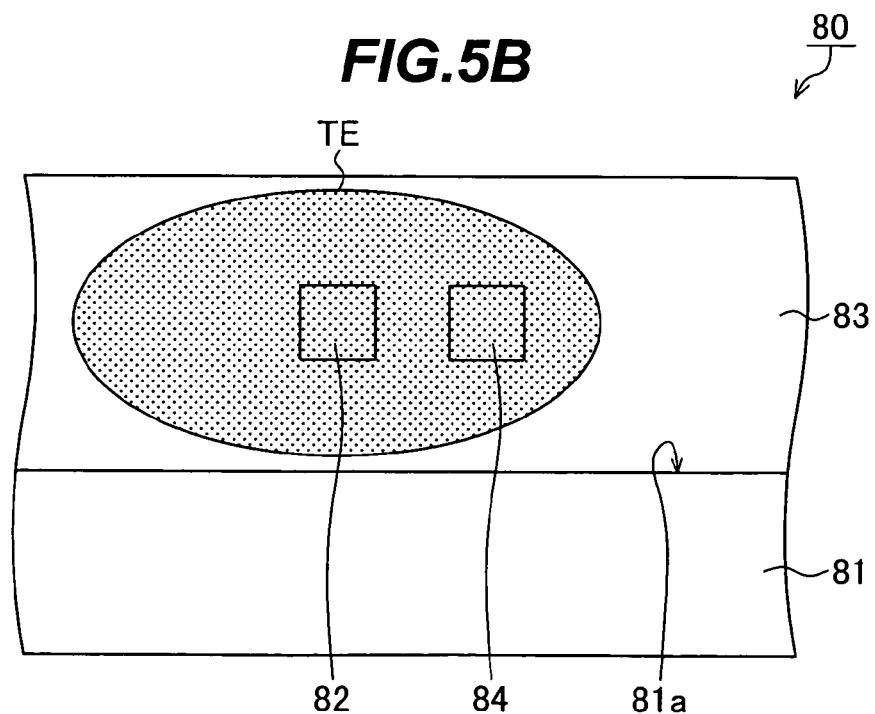
FIG. 5B is a schematic sectional view of the directional coupler in FIG. 5A, showing the TE wave distribution.

The directional coupler 80 in FIGS. 5A and 5B has parallel channel waveguides 82 and 84 formed in a clad 83 disposed on the first major surface 81a of a substrate 81. The waveguides are close enough together to allow optical coupling between them. The energy distributions of TE and TM waves launched into channel waveguide 82 are illustrated.

As shown in FIG. 5A, evanescent light from the TM wave in channel waveguide 82 spreads mainly in a direction perpendicular to the first major surface 81a of the substrate 81. Evanescent light of the TE wave spreads mainly in a direction parallel to the first major surface 81a of the substrate 81, as shown in FIG. 5B.

The rate of optical energy transfer from channel waveguide 82 to channel waveguide 84 in the directional coupler 80 depends on the amount of overlap of the evanescent TE or TM light with channel waveguide 84. In the example illustrated, channel waveguide 84 is completely inside the range of the evanescent light from the TE wave but only slightly overlaps the range of the evanescent light from the TM wave, so the TE wave couples at a faster rate than the TM wave. Consequently, the directional coupler 80 is not polarization independent.

This polarization dependent behavior is especially pronounced in a submicron optical waveguide with a silicon core. There are two reasons: silicon has a large refractive index, which differs greatly from the refractive index of the clad; and the core dimensions do not exceed the wavelength of the light, leading to a large spread of evanescent light.

The polarization independent optical device 10 in the first embodiment achieves polarization independence by adopting a ridge waveguide structure 20 including a planar waveguide layer 28.

If the thickness of the planar waveguide layer 28 of directional coupler 14a is adjusted appropriately, the evanescent light of TE and TM waves input to ridge section 30a1 have identical intensity in ridge section 30a2. The directional couplers 14a and 14b are then polarization independent, for the reasons described above.

The effects of the polarization independent optical device 10 in this embodiment will be described with reference to the tables in FIGS. 6 and 7, which show the equivalent refractive indexes of the polarization independent optical device 10 for the TE and TM waves, calculated by the finite element method, for light of the wavelengths 1.49 µm and 1.31 µm generally used in optical subscriber systems.

In FIGS. 6 and 7, $N_{eff0}$ is the equivalent refractive index of directional coupler 14a for symmetric mode light having a mode number m of zero; $N_{eff1}$ is the equivalent refractive index of directional coupler 14a for anti-symmetric mode light having a mode number m of one; $dN_{eff}$ is the absolute value of the difference between $N_{eff0}$ and $N_{eff1}$; Lc is the coupling length of directional coupler 14a, obtained from the values of $N_{eff0}$, $N_{eff1}$, and $dN_{eff}$; $N_{effa}$ is the equivalent refractive index in the optical interferometer 16. All of these values are calculated separately for the TE and TM waves.

In these tables, $dN_{eff}/dW$ is the rate of change in equivalent refractive index $N_{eff}$ when the ridge width W varies, calculated in order to evaluate the effect of dimensional error in the ridge width W on the equivalent refractive index $N_{eff}$; dLc/dW is the rate of change in coupling length Lc when the ridge width W varies, calculated in order to evaluate the effect of dimensional error in the ridge width W on the coupling length Lc; dLc/dS is the rate of change in coupling length Lc when the ridge height S varies, calculated in order to evaluate the effect of dimensional error in the ridge height S on the coupling length Lc.

The optical device 10 used to obtain the results shown in FIGS. 6 and 7 satisfied the first to third conditions for polarization independence and the dimensional requirements shown in FIG. 4A. The total core thickness H was 0.4 µm, the ridge height S was 0.33 µm, the ridge width W was 0.37 µm, and the ridge gap G was 0.3 µm.

The values of Lc in FIGS. 6 and 7 indicate that the polarization-dependent difference in coupling length in the directional couplers in the optical device 10 is within about 6%. The values of $N_{effa}$ in FIGS. 6 and 7 indicate that the polarization-dependent difference in the equivalent refractive index of the optical interferometer 16 is less than 1%.

These data indicate that the optical device 10 in this embodiment achieves adequate polarization independence for practical use.

The values of $dN_{eff}/dW$ and dLc/dW in FIGS. 6 and 7 indicate that the effect of dimensional error in the ridge width W on the equivalent refractive index $N_{eff}$ and coupling length Lc of the directional couplers 14a and 14b is about half the value obtained in conventional submicron silicon optical waveguides. The values of dLc/dS in FIG. 6 indicate that the effect of dimensional error in ridge height S on the coupling length Lc of the directional couplers 14a and 14b is about the same as the value obtained in conventional submicron silicon optical waveguides. These data indicate that in comparison with conventional optical devices, the novel polarization independent optical device 10 is less susceptible to the effects of dimensional error and can therefore be manufactured more easily.

In the polarization independent optical device 10 in this embodiment, the cross-sectional dimensions of the ridges 30 are the same in both the directional couplers 14a, 14b and the optical interferometer 16. In comparison with the prior art, in which the optical waveguides in the directional couplers and the optical interferometer must have different dimensions, the polarization independent optical device 10 in this embodiment can be produced more easily and with higher dimensional precision.

A few of the many possible variations of this embodiment will be described below with reference to FIGS. 8A, 8B, 9 and 10.

Figure 8A:
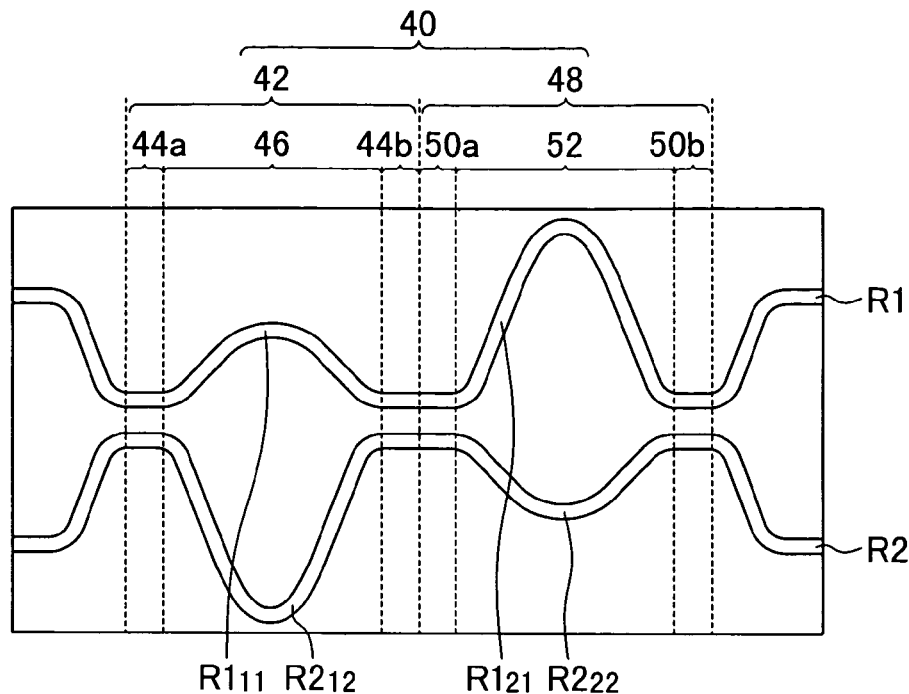
FIG. 8A is a schematic plan view illustrating the structure of an exemplary polarization independent optical wavelength filter as a variation of the optical device in FIG. 1.

FIG. 8A illustrates an exemplary optical wavelength filter including an even number of Mach-Zehnder interferometers. The Mach-Zehnder interferometers can be numbered from one to 2n, where n is an arbitrary positive integer, in order of their position in the ridge waveguide structure 40. The Mach-Zehnder interferometers are designed so that for any integer i from one to n, the optical path length difference ΔL1 of the (n−i+1)-th Mach-Zehnder interferometer is equal and opposite to the optical path length difference ΔL2 of the (n+i)-th Mach-Zehnder interferometer. The total optical path length difference of the two waveguides defined by the ridges R1, R2 in the ridge waveguide structure 40 is therefore zero. FIG. 8A shows an exemplary case in which there are only two Mach-Zehnder interferometers 42, 48 (n=1).

The Mach-Zehnder interferometers 42, 48 in FIG. 8A are both similar to the Mach-Zehnder interferometer 18 in the preceding embodiment, but are mutually point-symmetric with respect to the center point of the ridge waveguide structure 40. Ridge R1 accordingly defines the long arm of Mach-Zehnder interferometer 48 and the short arm of Mach-Zehnder interferometer 42, while ridge R2 defines the short arm of Mach-Zehnder interferometer 48 and the long arm of Mach-Zehnder interferometer 42. Like the ridges 30 in the preceding embodiment, ridges R1 and R2 have identical rectangular cross sections with constant dimensions.

Mach-Zehnder interferometer 42 includes two first directional couplers 44a, 44b, which are optically connected by a first optical interferometer 46. The first optical interferometer 46 includes two ridge sections having different optical path lengths: a ridge section $R1_{11}$ in ridge R1 and a ridge section $R2_{12}$ in ridge R2. If the optical path length of ridge section $R1_{11}$ is $LR1_{11}$ and the optical path length of ridge section $R2_{12}$ is $LR2_{12}$, then $LR2_{11}$ is less than $LR1_{12}$ ($LR1_{11} < LR2_{12}$).

Mach-Zehnder interferometer 48 includes two second directional couplers 50a, 50b connected by a second optical interferometer 52. The second optical interferometer 52 also includes two ridge sections having different optical path lengths: a ridge section $R1_{21}$ in ridge R1 and a ridge section $R2_{22}$ in ridge R2. If the optical path length of ridge section $R1_{21}$ is $LR1_{21}$ and the optical path length of ridge section $R2_{22}$ is $LR2_{22}$, then $LR1_{21}$ is greater than $LR2_{22}$ ($LR2_{22} < LR1_{21}$).

The optical path length difference between ridge sections $R1_{11}$ and $R2_{12}$ in the first optical interferometer 46, referred to below as the first optical path length difference ΔL1 or Δ1, is defined as the value obtained by subtracting the optical path length of the second ridge R2 from the optical path length of the first ridge R1 ($\Delta L1 = LR1_{11} - LR2_{12} = \Delta 1$). Because $LR1_{11}$ is less than $LR2_{12}$, the first optical path length difference (Δ1) is negative.

The optical path length difference between ridge sections $R1_{21}$ and $R2_{22}$ in the second optical interferometer 52, referred to below as the second optical path length difference ΔL2 or Δ2, is defined as the value obtained by subtracting the optical path length of the second ridge R2 from the optical path length of the first ridge R1 ($\Delta L2 = LR1_{21} - LR2_{22} = \Delta 2$). Because $LR2_{22}$ is less than $LR1_{21}$ and because the two Mach-Zehnder interferometers 42, 48 are mutually point symmetric, the second optical path length difference is equal and opposite to the first optical path length difference ($\Delta 2 = -\Delta 1$).

The total optical path length difference in the optical wavelength filter 40 is the sum of the first optical path length difference $\Delta L1$ ($=\Delta 1$) of Mach-Zehnder interferometer 42 and the second optical path length difference $\Delta L2$ ($=-\Delta 1$) of Mach-Zehnder interferometer 48. This sum is zero.

The operation of the optical wavelength filter 40 will be described with reference to the graph in FIG. 8B. This graph shows the wavelength distribution of light output from the second directional coupler 50b in the bar state and the cross state when mixed light including light having a wavelength of 1.49 μm and light having a wavelength of 1.31 μm is input to the first directional coupler 44a of the optical wavelength filter 40. The vertical axis represents the intensity (in arbitrary units) of light output from the second directional coupler 50b, and the horizontal axis represents the wavelength of the light.

Figure 8B:
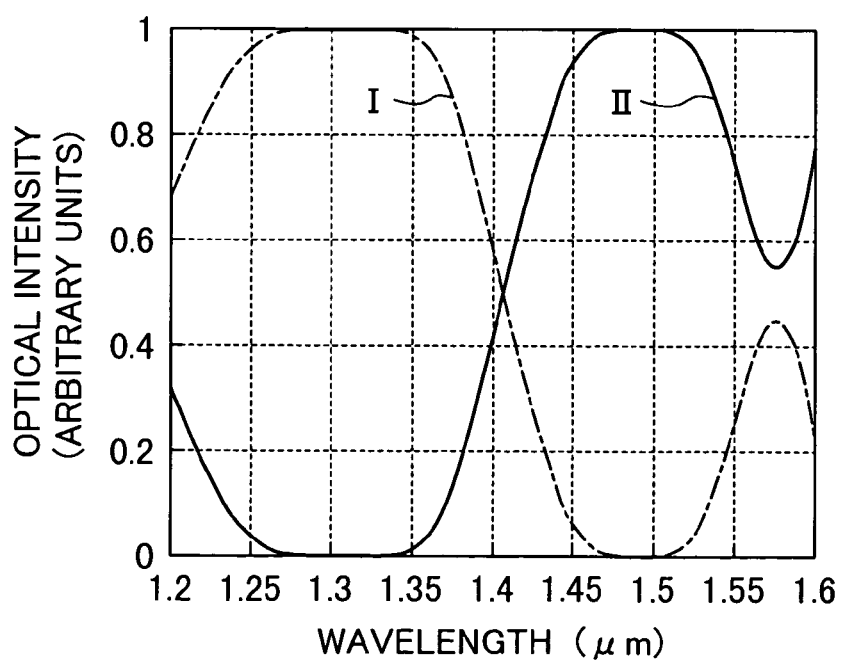
FIG. 8B is a graph illustrating operating characteristics of the optical wavelength filter in FIG. 8A.

Curve I in FIG. 8B represents the wavelength distribution of light output in the cross state from ridge R2 in second directional coupler 50b when mixed light is input to ridge R1 in first directional coupler 44a. Curve II represents the wavelength distribution of light output in the bar state from ridge R1 in second directional coupler 50b when mixed light is input to ridge R1 in first directional coupler 44a.

In the design conditions of the optical wavelength filter 40, the order of the first optical interferometer 46 and the second optical interferometer 52 with respect to light having a wavelength of 1.49 μm is 1.5. The total length of the first and second directional couplers 44a, 44b, 50a, 50b is four times the coupling length.

The wavelength passband in the cross state represented by the flat peak part of curve I in FIG. 8B is centered at a wavelength of about 1.31 μm and extends over a wavelength range of about 0.1 μm. The wavelength passband in the bar state represented by the flat peak area of curve II is centered at a wavelength of about 1.49 μm and extends over a wavelength range of about 0.05 μm.

This wavelength filter has a sufficient level of wavelength separation performance for practical use. The wavelength separation performance can be improved, however, by increasing the number of Mach-Zehnder interferometers from two to a larger even number.

Two other variations will be described very briefly.

Figure 9:
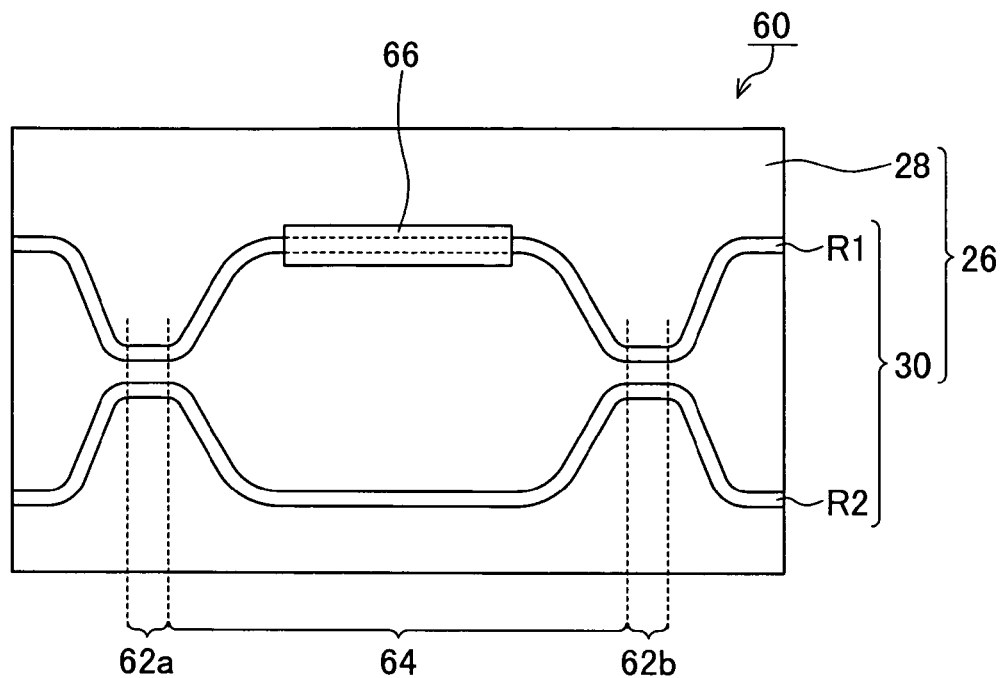
FIG. 9 is a schematic plan view illustrating the structure of an exemplary optical switch as a variation of the polarization independent optical device in FIG. 1.

FIG. 9 shows an optical switch 60 having a ridge waveguide structure as described in the preceding embodiment, including a planar waveguide layer (not shown) and two ridges R1, R2 that define a pair of directional couplers 62a, 62b connected optically by an optical interferometer 64. The two ridges R1, R2 have identical rectangular cross sections with constant dimensions.

The optical interferometer 64 differs from the Mach-Zehnder interferometer 18 in the above embodiment in that both ridges R1, R2 have the same intrinsic optical path length. However, the optical switch 60 also includes an electrode 66 positioned over ridge R1 in the optical interferometer 64, which enables the optical path length of ridge R1 to be varied under electrical control. An optical switching operation can thereby be executed.

Optical switches of this general type are well known, so a detailed description will be omitted. The novel feature of the optical switch 60 lies in the cross-sectional dimensions of its ridge waveguide structure, which provide polarization independent optical switching.

Figure 10:
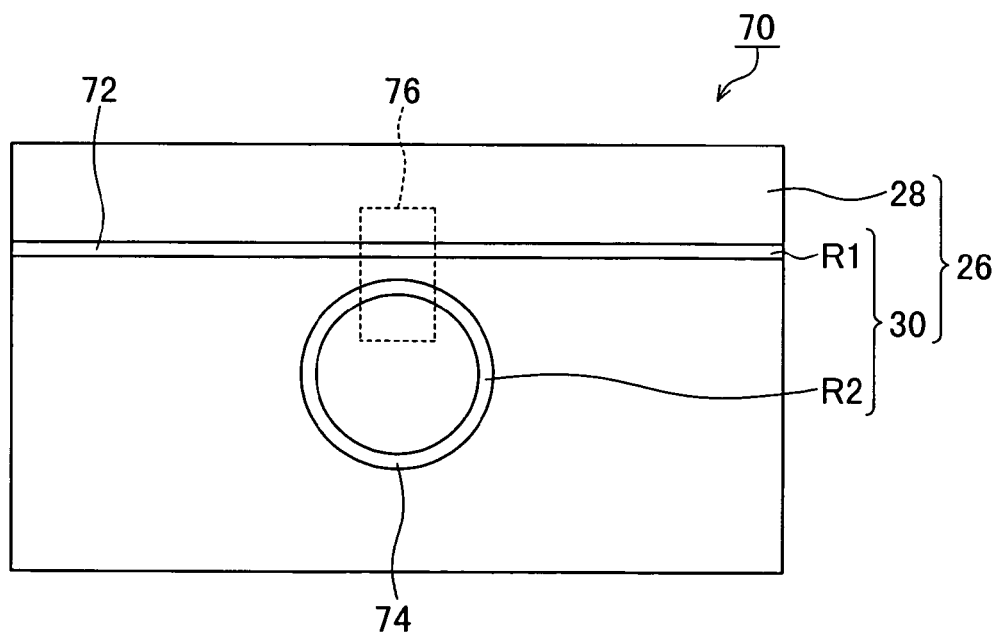
FIG. 10 is a schematic plan view illustrating the structure of an exemplary ring interferometer as a variation of the polarization independent optical device in FIG. 1.

FIG. 10 shows an optical ring resonator 70 that also has a ridge waveguide structure similar to the structure in the preceding embodiment, including a planar waveguide layer (not shown) and a pair of ridges R1, R2 having identical rectangular cross sections with constant dimensions that allow polarization independent operation as described above. The first ridge R1 defines a straight linear optical waveguide 72. The second ridge R2 defines a circular optical ring waveguide 74. The optical ring waveguide 74 and the linear optical waveguide 72 are placed close enough together to allow optical coupling between them in a section that forms a directional coupler 76. This optical ring resonator 70 can be used as a polarization independent optical filter or a polarization independent optical delay element.

Those skilled in the art will recognize that further variations are possible within the scope of the invention, which is defined in the appended claims.

What is claimed is:

1. A polarization independent optical device in which an optical element is formed on a major surface of a substrate, the optical element including a first clad, a second clad, and a core sandwiched between the first and second clads, the core comprising:
    a planar waveguide layer having a first surface in contact with the first clad, a second surface in contact with the second clad, and a thickness measured from the first surface to the second surface; and
    a plurality of ridges protruding from the second surface of the planar waveguide layer into the second clad to form a ridge waveguide structure for guiding propagation of light in the core, the ridges being integral with the planar waveguide layer; wherein
    the ridges have a rectangular cross section in a plane orthogonal to a direction of the propagation of the light through the core, the rectangular cross section having constant dimensions including a ridge width measured parallel to the second surface of the planar waveguide layer and a ridge height measured from the second surface of the planar waveguide layer to respective tops of the ridges, the core having a constant total core height measured from the first surface of the planar waveguide layer to the tops of the ridges;
    the ridge width is less than the total core height;
    the ridge height is less than the ridge width; and
    the thickness of the planar waveguide layer is equal to or less than one-fourth of the total core height.

2. The polarization independent optical device of claim 1, wherein the ridge waveguide structure constitutes at least one optical interferometer and at least two directional couplers.

3. The polarization independent optical device of claim 1, wherein:
    the first and second clads are made of a first material having a first refractive index;
    the core is made of a second material having a second refractive index; and
    the first refractive index is at least forty percent greater than the second refractive index.

4. The polarization independent optical device of claim 1, wherein:
    the first material is silicon dioxide; and
    the second material is silicon.

5. The polarization independent optical device of claim 1, wherein the ridge waveguide structure constitutes at least one Mach-Zehnder interferometer having two directional couplers and an optical interferometer, the optical interferometer comprising two optical waveguides defined by respective ridges in the ridge waveguide structure, the two optical waveguides joining the two directional couplers and having different optical path lengths between the two directional couplers.

6. The polarization independent optical device of claim 4, wherein the optical element is an optical wavelength filter in which the ridge waveguide structure constitutes 2n Mach-Zehnder interferometers coupled in series from a first Mach-Zehnder interferometer to a 2n-th Mach-Zehnder interferometer, n being a positive integer, wherein for each integer i from 1 to n, the two optical waveguides in the (n−i+1)-th Mach-Zehnder interferometer and the two optical waveguides in the (n+i)-th Mach-Zehnder interferometer have equal and opposite optical path length differences.

7. The polarization independent optical device of claim 1, wherein the ridge waveguide structure constitutes an optical switch comprising two directional couplers and an optical interferometer, the optical interferometer comprising two optical waveguides defined by respective ridges in the ridge waveguide structure, the two optical waveguides joining the two directional couplers, the polarization independent optical device also including an electrode disposed over one of the two optical waveguides in the interferometer.

8. The polarization independent optical device of claim 1, wherein the ridge waveguide structure constitutes an optical ring interferometer comprising a linear optical waveguide and an optical ring waveguide disposed close enough together to permit optical coupling between the linear optical waveguide and the optical ring waveguide.

* * * * *